United States Patent [19]
Campbell et al.

[11] 3,966,224
[45] June 29, 1976

[54] MULTIPLE INFLATION RATE OCCUPANT RESTRAINT SYSTEM

[75] Inventors: David D. Campbell; Edwin H. Klove, Jr., both of Bloomfield Hills, Mich.

[73] Assignee: General Motors Corporation, Detroit, Mich.

[22] Filed: Nov. 3, 1971

[21] Appl. No.: 195,310

[52] U.S. Cl. ............................. 280/735; 180/103 A
[51] Int. Cl.² ........................................ B60R 21/08
[58] Field of Search ............ 280/150 AB; 180/103, 180/104

[56] References Cited
UNITED STATES PATENTS

| | | | |
|---|---|---|---|
| 3,495,675 | 2/1970 | Hass et al. | 280/150 AB |
| 3,532,358 | 10/1970 | Selwa et al. | 280/150 AB |
| 3,582,107 | 6/1971 | Goetz et al. | 280/150 AB |
| 3,638,964 | 2/1972 | Chute | 280/150 AB |
| 3,663,035 | 5/1972 | Norton | 280/150 AB |
| 3,674,059 | 7/1972 | Stephenson | 280/150 AB |
| 3,684,309 | 8/1972 | Uchiyamada | 280/150 AB |
| 3,713,667 | 1/1973 | Blanchard | 280/150 AB |
| 3,744,815 | 7/1973 | Scherenberg | 280/150 AB |

*Primary Examiner*—M. H. Wood, Jr.
*Assistant Examiner*—John P. Silverstrim
*Attorney, Agent, or Firm*—Herbert Furman

[57] ABSTRACT

A vehicle includes an inflatable occupant restraint cushion inflated from an inflater. The inflater is of the air-augmented type and includes a pressure vessel containing gas under pressure and a gas generator. The outlet of the vessel to the cushion is sealed by a diaphragm rupturable by electrically fired detonators. The gas generator is actuated by either an electrically fired pyrotechnic delay squib or by a nondelay pyrotechnic squib. A pair of low level acceleration responsive sensors connect the detonators and the delay squib across a source of power. When the vehicle is subjected to an impact generating a pulse above a predetermined minimum amplitude and time and below a predetermined maximum, the sensors fire the delay squib and the detonators. The gas is immediately released to initiate partial inflation of the cushion. After a predetermined time interval, the delay squib actuates the gas generator to complete inflation of the cushion. A high level acceleration responsive sensor, actuated by a pulse equal to or above the predetermined maximum, is in series with one of the low level sensors and the nondelay squib across the source of power. When an impact generates an acceleration pulse equal to or above the predetermined maximum, the low level sensors fire the detonators to release the gas to the cushion and one low level sensor and the high level sensor fire the nondelay squib to substantially simultaneously actuate the gas generator. The time interval is interrupted any time that a pulse equal to or exceeding the predetermined maximum is generated, such as during a multiple impact situation.

1 Claim, 2 Drawing Figures

MULTIPLE INFLATION RATE OCCUPANT RESTRAINT SYSTEM

This invention relates to a multiple inflation rate occupant restraint system and more particularly to such an occupant restraint system which includes an inflater of the air-augmented type which is actuated in accordance with the occurrence of predetermined levels of intensity of impact of the vehicle with an obstacle to provide multiple rates of inflation of an inflatable occupant restraint cushion.

Inflaters of the air-augmented type for use in occupant restraint systems are well known. Such inflaters include a gas generator housed within a pressure vessel which is sealed by a pressure rupturable diaphragm and contains gas, such as air or nitrogen, under pressure. When the gas generator is actuated by an electrically fired squib, the resultant products of combustion mix with the gas and the increase in pressure of the resultant mixture ruptures the diaphragm for release of the mixture to a conventional distribution system for inflation of an occupant restraint cushion.

The system of this invention utilizes an air-augmented inflater which is actuated in various manners in accordance with the occurrence of predetermined levels of intensity of impact of the vehicle with an obstacle to provide multiple rates of inflation of an occupant restraint cushion. One manner of actuation includes the initial release of the gas from the pressure vessel to partially inflate the cushion, and the subsequent release, after a predetermined time interval, of the products of combustion of the gas generator to complete inflation of the cushion. A second manner includes the substantially simultaneous release of both the gas from the pressure vessel and the products of combustion of the gas generator to the cushion for complete inflation thereof.

Further additional manners of actuation include the release of the products of combustion of the gas generator to complete the inflation of the cushion during the time interval of the one manner of actuation if the level of intensity of impact increases during such time interval.

The multiple manners of actuation of the inflater permit the selection of various rates of inflation of the cushion in accordance with predetermined levels of intensity of impact of the vehicle with an obstacle. The one manner of actuation generally provides a stepped rate of inflation since the rate of inflation initially decreases as the gas flows to the cushion and then subsequently increases as the products of combustion of the gas generator flow to the cushion. Pressure fluid is always flowing to the cushion since the flow of gas is not fully terminated before the products of combustion begin to flow. The stepped rate of inflation decreases over the initial time interval, approximately 40 milliseconds, and then subsequently increases again to a maximum, approximately 60 to 80 milliseconds, after the start of inflation of the cushion. The second manner of actuation also provides a somewhat stepped rate of inflation since there is a delay, approximately ten milliseconds, between the initial flow of the gas to the cushion and the flow of the products of combustion to the cushion. Generally, the rate of inflation in the second manner of actuation is at its highest level at approximately the time that the rate of inflation of the one manner of actuation is at its lowest level.

At low level intensity impacts, the time in which the fully inflated cushion must be in position between the occupant and the portion of the vehicle is greater than in high level intensity impacts. The time of inflation of the cushion also controls any force applied by the cushion to the occupant during the deployment and full inflation of the cushion.

One of the problems with current air cushion systems is the out-of-position occupant. Such occupant may be out of normal seated position due to braking or skidding of the vehicle prior to impact or may be out of position due to his own volition. Such an occupant may be located closer to a portion of the vehicle from which the cushion deploys than an occupant in normal seated position and the deployment and initial inflation of the cushion may exert a greater force on him than is required by the level of intensity of the impact. In low level intensity impacts, the one manner of actuation permits the cushion to be partially inflated and deployed with minimum force prior to complete inflation of the cushion after a time interval. If the occupant is out of position, he will be subjected to minimum force and moved toward normal seated position prior to complete inflation. In impacts of higher level intensity, there is less time for the cushion to be fully inflated and in position between the occupant and the portion of the vehicle. Consequently, there is insufficient time to first partially inflate the cushion and then fully inflate the cushion and the intervening time interval is dispensed with.

A vehicle is often subjected to multiple impacts of varying levels of intensity, such as often occurs when the vehicle successively impacts obstacles of varying strength. If the initial obstacle impacted by the vehicle produces a low level intensity of impact, the one manner of actuation is selected. If during the time interval between partial and complete inflation, a successive impact generates a higher level of intensity, then the second manner of actuation will complete inflation of the cushion immediately without waiting for the time interval to pass. Thus, again, the system of this invention selects the rate of inflation of the cushion in accordance with the level of intensity of impact of the vehicle, even if such level of intensity changes due to multiple impact conditions. In such instance, the overall rate of inflation will vary depending on the point in the time interval at which the second manner of actuation occurs.

It is therefore the primary feature of this invention to provide a multiple inflation rate occupant restraint system by releasing stored gas from a pressure vessel and controlling the substantially simultaneous or sequential actuation of a gas generator in accordance with the level of intensity of impact of the vehicle with an obstacle.

This and other features of this invention will be readily apparent from the following sepcification and drawings wherein.

Figure 1:
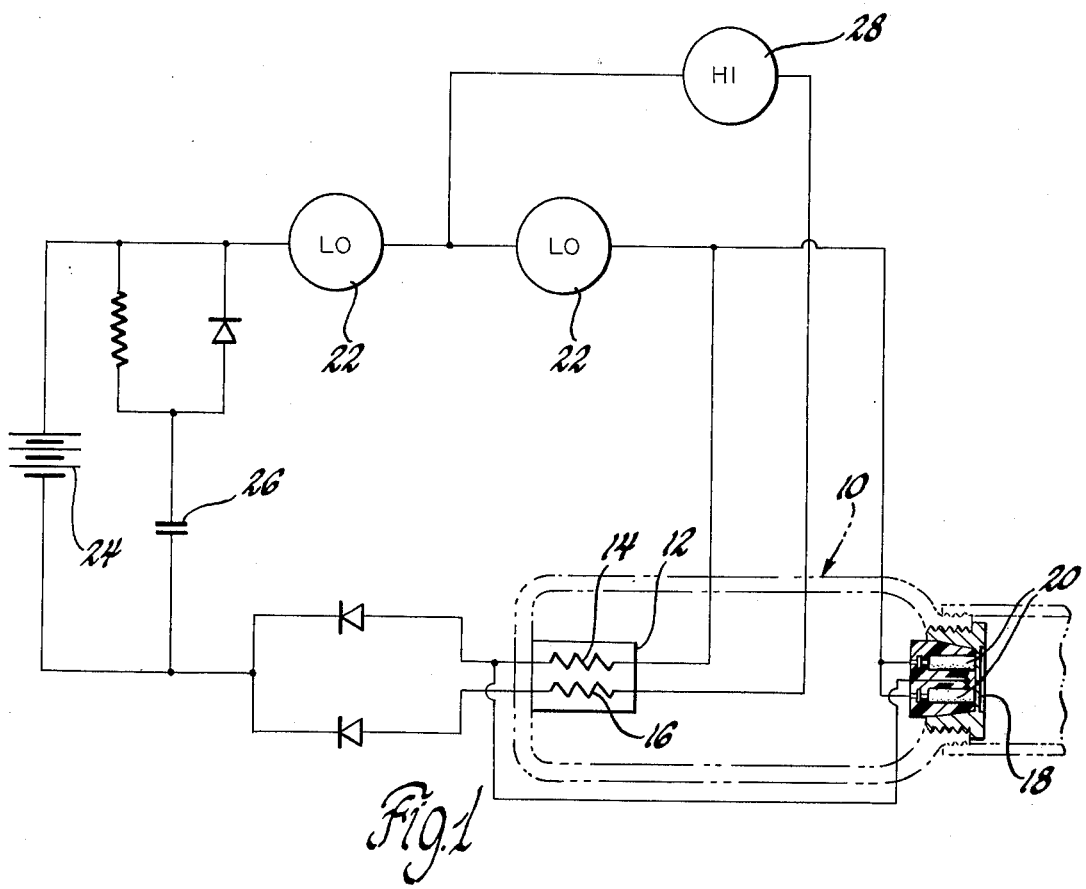
FIG. 1 is a schematic diagram of a system according to this invention.

Referring now to FIG. 1 of the drawings, an inflater of the air-augmented type includes a pressure vessel 10 having mounted adjacent one end thereof a conventional gas generator 12. Such gas generator includes a pair of electrically fired conventional squibs—one, 14, being of the time delay type and the other, 16, being of the non-time delay type. Both types are essentially the same and include a bridge wire for igniting ignition material which in turn ignites an intermediate charge material which in turn ignites an output charge material. Such materials are conventionally layered within a cylindrical housing and the ignition of the output charge material ruptures the housing such that the flame of combustion ignites surrounding chemical material which burns to generate gas of elevated pressure and temperature. The time delay squib 14 is essentially the same except that it includes a delay charge layer prior to the output charge layer. Such layer burns at a controlled rate to create a time delay between the ignition of the ignition layer and that of the output layer.

The other open end of the gas generator is sealed by a conventional diaphragm assembly which includes a diaphragm 18 rupturable upon firing of one or both conventional electrically fired detonators 20. The pressure vessel 10 contains a predetermined volume of gas, such as air or nitrogen, under a pressure of approximately 2200 psi. The outlet of the pressure vessel, when opened by rupture of the diaphragm 18, communicates with a conventional inflatable occupant restraint cushion by means of conventional manifold and diffuser structure. The details of the cushion and the manifold and diffuser structure are not shown herein and reference may be had to Ser. No. 142,533 Noll et al, Occupant Restraint System, filed May 12, 1971, for such details.

The diaphragm 18 is ruptured to release the gas from the pressure vessel to initiate inflation of the cushion upon the occurrence of a minimum level intensity impact of the vehicle with an obstacle.

Low level acceleration responsive sensors 22 are in series with each other and are connected across the vehicle battery 24 with the delay squib 14 of the gas generator 12 and the detonators 20 for rupturing the diaphragm 18. A capacitor 26 is provided to supply power in the event of battery failure. The sensors 22 may be of the type shown in Ser. No. 35,674 Gillund, Sensor, filed May 8, 1970, or of the type shown in Ser. No. 158,170, Porter et al, Sensor, filed June 30, 1971. Such sensors are calibrated so as to be actuated when an impact of the vehicle with an obstacle generates an acceleration pulse of predetermined minimum amplitude and time, such as an impact of 15 to 18 mph barrier equivalent. Upon actuation of the sensors 22, the detonators 20 are electrically fired to rupture the diaphragm 18 and initiate flow of the gas from the pressure vessel 10 to the cushion for deployment and partial inflation thereof. After a predetermined time delay set by the calibration of the delay squib 14, such as 40 milliseconds, the gas generator 12 is fired and the resultant products of combustion will thereupon flow to the cushion.

The rate of inflation will be of stepped type as previously mentioned. The gas will partially inflate the cushion and deploy the cushion from its noninflated position on a portion of the vehicle toward an occupant seating position. If the position is occupied and the occupant is in the path of deployment of the cushion, due to being out of position or otherwise, the cushion will generally wrap itself around such occupant and move the occupant toward normal seated position with minimum force. After such partial inflation and deployment of the cushion and the completion of intervening time interval set by the delay squib 14, the resultant products of combustion from the gas generator will flow to the cushion to complete inflation of the cushion and limit movement of the occupant relative to the portion of the vehicle on which the cushion is mounted.

A high level sensor 28 is in series with one of the low level sensors 22 and with the nondelay pyrotechnic squib 16 across the battery. Sensor 28 is of the same structure as sensors 22, or different therefrom as desired, but is calibrated so as to be actuated when an impact of the vehicle with an obstacle generates an acceleration pulse of amplitude and time equal to or exceeding a predetermined maximum, such as an impact of 28 to 30 mph barrier equivalent. When such an acceleration pulse of predetermined maximum amplitude and time is generated, the sensors 22 will, of course, be actuated to fire the detonators 20 and release the gas from the pressure vessel 10 to initiate deployment and inflation of the cushion, as previously explained. The pyrotechnic delay squib 14 will, of course, also be actuated. However, before this squib burns through its time delay period, the sensor 28 will fire the nondelay squib 16 so that the gas generator will be ignited substantially simultaneously, such as within ten milliseconds after firing of the detonators 20, so that the products of combustion of the gas generator flow with the gas from the pressure vessel 10 to the cushion to complete inflation thereof.

From the foregoing description, it can be seen that a low level intensity of impact generating a pulse exceeding a predetermined minimum amplitude and time and not exceeding a predetermined maximum, will provide a low rate of inflation of the cushion If the pulse equals or exceeds the predetermined maximum, then a high rate of inflation of the cushion is provided.

The system of this invention also provides other rates of inflation of the cushion intermediate the low and high levels in certain types of impacts, particularly multiple impacts of the vehicle with obstacles during the time interval of delay provided by the squib 14. If the initial impact generates a pulse exceeding the predetermined minimum but below the predetermined maximum, the low rate of inflation of the cushion is initiated. If another impact during the time interval generates a pulse equal to or exceeding the predetermined maximum, then the high rate of inflation is immediately initiated without any delay. The initiation of the high rate of inflation can occur at any point in time during the time interval of delay set by the delay squib 14.

Figure 2:
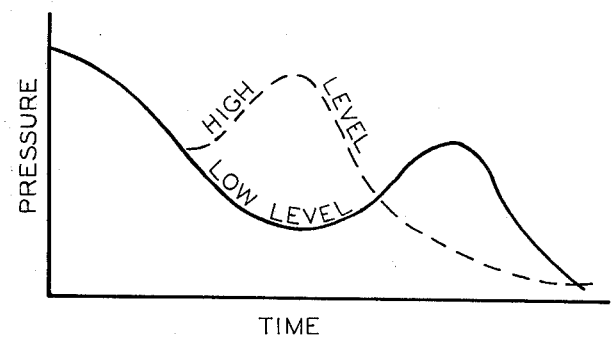
FIG. 2 is a graph.

FIG. 2 shows a graph of pressure in the pressure vessel 10 versus time. The full line indicates the pressure at the low rate of inflation and the dash line indicates the pressure at the high rate of inflation. The initial pressure at time 0 is the same and the initial pressure drop is the same to about an elapsed time of 10 milliseconds. From this time point to an elapsed time of 40 milliseconds, the pressure continues to drop at the low rate of inflation as the gas flows from the pressure vessel 10 and then begins to rise as the gas generator is fired and the products of combustion flow from the gas generator with the remaining gas to the cushion. The pressure never drops to zero since the gas generator is fired before all of the gas has flowed from the pressure vessel to the cushion. At the high rate of inflation, the pressure begins to rise after the elapsed time of 10 milliseconds since the gas generator has been fired and the products of combustion begin to flow to the cushion with the gas from the pressure vessel. The rise in pressure continues until an elapsed time of 40 milliseconds and then drops. The final drop in pressure at the high rate of inflation occurs during the time that the pressure at the low rate of inflation is increasing and clearly indicates the relative difference in rates of inflation. In multiple impact situations, the pressure lines will, of course, fall between the two lines shown in FIG. 2, after an elapsed time of ten milliseconds.

It should also be mentioned that the sensors 18 and 28 may be replaced by the system disclosed in Ser. No. 175,576 (A-15,660) Jones, filed Aug. 27, 1971, wherein a switch responsive to an energy absorbing bumper system being subject to an impact exceeding its level of absorption is in series with an acceleration responsive sensor to initiate low level inflation of the cushion, and high level inflation is obtained through the use of a sensor 22 and a sensor 28 as disclosed herein.

Thus, this invention provides a multiple inflation rate occupant restraint system.

We claim:

1. A vehicle occupant restraint system comprising, in combination, source means actuatable to provide first and second volumes of pressure fluid, an occupant restraint cushion inflatable from the source means, first control means responsive to the vehicle being subjected to an initial impact of predetermined minimum intensity not exceeding a predetermined maximum intensity to release the first volume of pressure fluid to the cushion and including time delay means providing a predetermined fixed time interval for actuating the source means to sequentially release the second volume of pressure fluid to the cushion after said predetermined fixed time interval, and second control means responsive to the occurrence within the predetermined time interval of the vehicle being subjected to a subsequent impact of intensity equal to or exceeding the predetermined maximum for actuating the source means to release the second volume of pressure fluid to the cushion within said predetermined fixed time interval.

* * * * *